United States Patent [19]

Kohn

[11] Patent Number: 4,746,472
[45] Date of Patent: May 24, 1988

[54] ULTRATHIN POLYARYLATE POLYMER FILMS AND THEIR PREPARATION

[75] Inventor: Rachel S. Kohn, Springfield, N.J.

[73] Assignee: Hoechst Celanese Corporation, Somerville, N.J.

[21] Appl. No.: 917,725

[22] Filed: Oct. 10, 1986

[51] Int. Cl.[4] .............................................. B29C 41/12
[52] U.S. Cl. .......................................... 264/41; 55/16; 210/500.27; 264/298; 264/331.21; 428/220; 524/466
[58] Field of Search ................. 428/220; 264/298, 41, 264/331.21; 524/466

[56] References Cited

U.S. PATENT DOCUMENTS

| | | | |
|---|---|---|---|
| 3,551,284 | 12/1970 | Forester et al. | 264/298 |
| 4,155,793 | 5/1979 | Salemme et al. | 264/298 |
| 4,279,855 | 7/1981 | Ward, III | 264/298 |
| 4,556,530 | 12/1985 | van der Scheer et al. | 264/298 |

*Primary Examiner*—Allan M. Lieberman
*Attorney, Agent, or Firm*—Lynch, Cox, Gilman & Mahan

[57] ABSTRACT

Disclosed herein are free-standing, pinhole-free, ultrathin, polyarylate films having thicknesses of about 400 angstroms or less and a process to prepare them. The films find particular utility in separatory applications.

20 Claims, No Drawings

ULTRATHIN POLYARYLATE POLYMER FILMS AND THEIR PREPARATION

STATEMENT AS TO RIGHTS TO INVENTIONS MADE UNDER FEDERALLY SPONSORED RESEARCH AND DEVELOPMENT

This invention was made with Government support under Contract No. DAAK 20-84-C-0147 awarded by the Department of Defense (DOD). The Government has certain rights in this invention.

BACKGROUND OF INVENTION

1. Field of Invention

This invention relates to polymer films. More particularly, this invention relates to ultrathin polyarylate polymer films and their production.

2. Prior Art

In U.S. Pat. No. 2,760,233, a process is disclosed for preparing curved polymer sheets from polyesters. However, no specific solvent mixtures or ratios suitable for casting ultrathin, pinhole-free, polyarylate films are disclosed nor are any film thicknesses provided.

U.S. Pat. No. 3,551,244 discloses a process for preparing on a water surface films having thicknesses between 0.05 and 5.0 microns (i.e. between 500 and 50,000 angstroms). The patent discloses certain halogenated solvents, such as chloroform and chlorobenzene, as being suitable casting solvents and states that polyester films can be prepared. However, no specific solvent mixtures and ratios suitable for casting pinhole-free, polyarylate films with thicknesses less than 400 angstroms are disclosed.

In U.S. Pat. No. 3,933,561, a process for preparing polymer films having thicknesses less than 2.5 microns (eg. 1000 angstroms) is disclosed. Polyesters are listed as suitable polymers for use in the patent's process. However, polyarylates are not specifically disclosed nor are suitable solvent ratios for casting ultrathin, polyarylate films described.

U.S. Pat. No. 3,767,737 discloses a method for producing polymer membranes having thicknesses between 0.005 and 0.05 mils on a support liquid. Any polymer or copolymer capable of film casting is alleged by the inventor to be suitable for use in the process. However, polyacrylate films are not disclosed nor are specific mixtures of solvents and appropriate solvent ratios for preparing void-free, polyarylate films having thicknesses of 400 angstroms or less.

U.S. Pat. Nos. 4,155,793, 4,279,855 and 4,374,891 disclose processes for preparing substantially void-free, ultrathin, permeable, polymeric membranes having thicknesses of 500 angstroms or less. Natural and synthetic polymers are asserted to be suitable for use in the disclosed process. However, only films prepared from organopolysiloxane-polycarbonate interpolymers mixed with polyphenylene oxide are disclosed in the examples. Polyarylate films are not disclosed nor are suitable solvent mixtures and ratios for casting polyarylate films having thicknesses of 400 angstroms or less.

Other patents, such as U.S. Pat. Nos. 2,631,334, 2,689,187, and 4,393,113, also disclose ultrathin polymeric films. However, polyacrylate films are not disclosed in these patents.

In the prior art, the preparation of ultrathin, void-free, polyarylate, free-standing films with thicknesses of less than 400 angstroms generally has not been disclosed. Usually, when attempts are made to cast polymer films with thicknesses of less than 400 angstroms, defective films containing voids and other macroscopic defects usually result.

Therefore, it is an object of this invention to prepare ultrathin, polyacrylate polymer films.

It is a further object of this invention to prepare pinhole-free, polyarylate polymeric films.

It is also an object of this invention to prepare free-standing polyarylate films having thicknesses of 400 angstroms or less.

These and other objects are obtained by the products and process of the present invention.

SUMMARY OF INVENTION

The instant invention provides a process for preparing macroscopically pinhole-free, ultrathin, polyarylate, free-standing films having thicknesses of about 400 angstroms or less. The films are prepared by dissolving a polyarylate polymer in a suitable mixture of chlorinated solvents, such as 1,2,3-trichloropropane and ortho-dichlorobenzene, to form a polymer solution, casting the solution on water to form a free-standing film, and removing the film from the water. The ultrathin films of the present invention can be used in separatory applications and as drug release membranes from the controlled release of drugs.

DETAILED DESCRIPTION OF INVENTION

Polyarylates are a family of aromatic polyesters and their preparation is well known. They are derived from aromatic dicarboxylic acids and diphenols. The preferred polyacrylates are prepared from isophthalic or terephthalic acids and bisphenol A.

In general, there are two processes that are widely used to prepare polyarylates. The first process involves reacting acid chlorides, such as isophthaloyl and terephthaloyl chlorides, with diphenols, such as bisphenol A, to yield polyarylates. The acid chlorides and diphenols can be treated with a stoichiometric amount of an acid acceptor, such as triethylamine or pyridine. Alternatively, an aqueous solution of the dialkali metal salt of the diphenols can be reacted with a solution of the acid chlorides in a water-insoluble solvent such as methylene chloride, or a solution of the diphenol and the acid chlorides can be contacted with solid calcium hydroxide with triethylamine serving as a phase transfer catalyst.

The second process involves polymerization by a high-temperature melt or slurry process. For example, diphenyl isophthalate or terephthalate is reacted with bisphenol A in the presence of a transition metal catalyst at temperatures greater than 230° C. Since transesterification is a reversible process, phenol, which is a by-product, must be continually removed from the reaction vessel in order to continue polymerization and to produce high molecular weight polymers.

Various processes for preparing polyarylates are disclosed in "Polyarylates," by Maresca and Robeson in *Engineering Thermoplastics*, James Margolis, ed., New York: Mercel Dekker, Inc. (1985), pages 255–259, which is incorporated herein by reference as well as the articles and patents disclosed therein which describe the various processes in greater detail.

The preferred polyarylate polymers have recurring units of the formula:

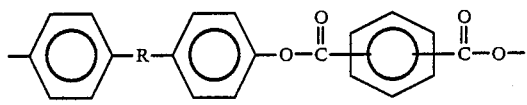

wherein R is $C_1$–$C_6$ alkyl, preferably $C_3$ and have molecular weights, $M_w$, greater than about 5,000 and preferably greater than about 30,000. The most preferred polymer has recurring units of the formula:

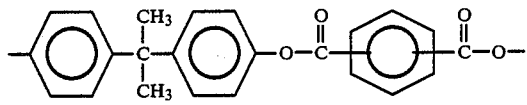

The most preferred polymer is available from the Union Carbide Corporation under the tradename Ardel D-100.

The solvents suitable for casting ultrathin, polyarylate films are chlorinated solvents, such as 1,2,3-trichloropropane, ortho-dichlorobenzene, ethylene chloride, and dichloroethane. It is possible to cast films having thicknesses greater than about 400 angstroms, preferably about 400 to about 500 angstroms, by employing 1,2,3-trichloropropane alone as the casting solvent. However, to cast films with thicknesses of about 400 angstroms or less, it is necessary to employ ortho-dichlorobenzene along with 1,2,3-trichloropropane to produce films containing no macroscopic holes. It is also possible to employ other chlorinated solvents, such as ethylene chloride and dichloroethane along with 1,2,3-trichloropropane and ortho-dichlorobenzene to prepare films having thicknesses of 400 angstroms or less. Some suitable mixtures of solvents include about a 2:1 to about a 20:5 by volume ratio of 1,2,3-trichloropropane:ortho-dichlorobenzene, preferably about 20:5 to about 20:7, and most preferably about 20:7. Another suitable solvent mixture is about a 16:5:3 by volume ratio of 1,2,3-trichloropropane:orthodichlorobenzene:ethylene chloride (or dichloroethane). If the amount of dichlorobenzene in the ratios above is decreased too much, the films will contain macroscopic holes.

After a suitable solvent mixture is prepared, the polyarylate polymer is dissolved in the solvent mixture at temperatures below about 100° C. (eg. 60° C.) for several hours (eg. three to seven hours) to prepare a casting solution. The casting solution should contain about three to about twelve percent by weight of the polymer based upon the total weight of the casting solution, preferably about five to about ten percent and most preferably about seven to about eight percent. Generally, the greater the amount of polymer in the casting solution, the thicker the films will be that are prepared. Conversely, the lower the amount of polymer, the thinner the films will be. However, if the amount of polymer is too low, such as one percent by weight or less, the film will be too fragile to lift from the casting surface and will contain defects, such as holes. The polymer solution can be employed immediately after preparation or stored in appropriate containers, such as teflon bottles, at room temperature.

It is possible to cast polyarylate films from a polymer solution containing a polyarylate polymer and a minor amount of other polymers which are compatible in film form with the polyarylate and which can be dissolved in the casting solution. When other polymers are mixed with the polyarylate, the amount of the polyarylate employed should be 80 percent or more by weight based upon the total weight of polymers dissolved in the polymeric solution. Examples of these compounds include other polyesters.

Before the polymeric solution is cast into films, it is preferred to filter the solution using microfilters and/or membranes. Filtration of the polymer solution before casting substantially reduces imperfections in the cast films and removes insoluble additives, such as polyethylene terephthalate, which are present in most commercially available polyarylate polymers. It is preferred to remove such additives because they can cause filmes to be cloudy or hazy in appearance, to have holes or to be non-uniform. The solution can be suction filtered through glass microfiber filters and then passed through one or more Millipore microfiltration membranes having pores with diameters of about 0.2 to 10 microns and available from the Millipore Corporation. It is preferred to pass the solution through a series of Millipore membranes, the first membrane having a pore size of ten microns, the second of five, the third of three, the fourth of one and the last of 0.2 micron. In order to enable the solution to pass through the smaller pore size membranes, it is usually necessary to apply pressure. For example, a Millipore stainless 47 mm pressure holder operated at a pressure up to 100 psi argon can be used. The amount of pressure applied will depend upon the viscosity of the solution and the pore size of the membrane.

After filtration, the solution is cast on water at or near room temperature. As used herein the term "water" includes aqueous solutions containing minor amounts (eg. one percent or less by weight based upon the total weight of the solution) of organic solvents (eg. lower weight alcohols) the presence of which does not adversely affect the properties of the films cast on the solution. The addition of such organic solvents may facilitate the removal of the film from the water's surface. The water is contained in any suitable walled container. For example, an appropriate container is an aluminum container having dimensions of 12"×12"×3". Preferably, the walls of the container are sloped outwardly at about a 20 degree incline to reduce reflected surface waves which can damage a film. Such waves are produced when the polymeric solution is placed on the water's surface or by air currents and external vibrations. Most preferably, the inside walls are teflon coated so that films are less likely to stick to the sides of the container.

The polymeric solution is cast by depositing a drop of the polymer solution upon the water's surface. The solution usually spreads over the surface of the water in three seconds or less. The solution is allowed to stand until a sufficient amount of the solvent has evaporated to form a free-standing film. As used herein, the term "free-standing film" refers to a film that has a physically stable shape and is dimensionally stable on its casting surface and can be removed from the casting surface without having to be supported over the entire surface area of the film. The time of evaporation generally is between 20 and 30 seconds and rarely more than about 60 seconds.

The films of the instant invention do not contain any macroscopic pinholes. However, they may contain a few microscopic pinholes. The temperature of the casting surface has an influence upon the number of microscopic holes in the film. The preferred temperature of the casting surface is about 22° C. At temperatures above or below 22° C., there are more microscopic pinholes in the films. The water in the casting container can be maintained at the desired temperature by any appropriate means.

After the solvent has evaporated, the film is lifted from the liquid surface using any suitable means, such as a 2"×3", thin, aluminum plate having a 30 millimeter inner diameter hole in it and a handle on one end of the plate. When the aluminum plate touches the surface of the film, the film adheres to the aluminum plate and may be readily removed from the surface of the water.

The films of the instant invention are generally round, ultrathin, pinhole-free, uniform, colorless films having a diameter of about six inches and a thickness of 500 angstroms or less, preferably about 400 angstroms or less and most preferably about 180 angstroms or less. As used herein, the term "ultrathin film" refers to a film having a thickness of about 500 angstroms or less, and the term "pinhole-free film" refers to a film containing no macroscopic holes.

The films of this invention can be used as gas separation membranes and in end uses where a controlled release of drugs is needed.

The invention is illustrated by the following examples in which all percentages are by weight unless otherwise specified.

EXAMPLE 1

A polymer solution containing six percent by weight polyarylate dissolved in 1,2,3-trichloropropane was prepared by magnetically stirring the solvent and the polymer for about five hours at 60° C. The polyarylate polymer, Ardel D-100, had the general formula:

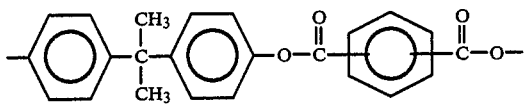

and a molecular weight, $M_w$, of about 38,000, a Tg of 190° C. and was obtained from the Union Carbide Corporation. The solution was filtered through a 0.45 pore size Durapore polyvinylidene fluoride membrane obtained from the Millipore Corporation.

After filtration, a drop of the polymer solution was deposited on 22° C. water contained in a square aluminum container measuring 12"×12"×3" having teflon coated walls which were sloped outwardly at a 20 degree incline. The drop spread rapidly over the surface of the water to form a film having a diameter of about five inches. After 20 seconds, the film was lifted from the surface of the water using a 2"×3" aluminum plate with a 30 mm diameter hole in the middle and a handle attached at one end. The film had a thickness of about 200 angstroms and contained several macroscopic holes.

EXAMPLE 2

Example 1 was repeated except that a solution containing 7.4 percent by weight of the polyarylate polymer dissolved in a 20:7 by volume mixture of 1,2,3-trichloropropane:ortho-dichlorobenzene was prepared and then filtered through a series of membranes having pore sizes of 10.0, 5.0, 3.0, 1.0, and 0.2 microns. The membranes were all obtained from the Millipore Corporation. The 10.0 and 5.0 micron membranes were Mitex polytetrafluoroethylene membranes. The 3.0, 1.0 and 0.2 micron membranes were Fluoropore polytetrafluoroethylene membranes. The film from this solution, prepared as specified in Example 1, had a diameter of about six inches, a thickness of about 180 angstroms, and exhibited no macroscopic voids. Microscopic examination of the film disclosed about two pinholes having diameters of about 30 microns.

EXAMPLE 3

Example 2 was repeated except that the temperature of the water in the casting container was about 20° C. The resulting film had a thickness of about 180 angstroms and contained no macroscopic holes. However, microscopic examination of the film disclosed about nine microscopic pinholes having diameters of about 30 microns.

EXAMPLE 4

Example 2 was repeated except that the temperature of the water in the casting container was about 24° C. The resulting film had a thickness of about 180 angstroms and contained no macroscopic holes. Microscopic examination of the film disclosed 10 elliptical pinholes in the film.

EXAMPLE 5

Example 2 was repeated except that a 20:1 ratio of 1,2,3-trichloropropane:ortho-dichlorobenzene was employed. The resulting film had macroscopic pinholes.

EXAMPLE 6

Example 2 was repeated except that a 20:3 by volume ratio of 1,2,3-trichloropropane:ortho-dichlorobenzene was utilized. The resulting film had macroscopic pinholes.

EXAMPLE 7

Example 1 was repeated except that a five percent by weight Ardel D-100 solution was prepared in a 2:1 ratio of 1,2,3-trichloropropane:ortho-dichlorobenzene. The film contained no macroscopic holes and was slightly non-uniform.

EXAMPLE 8

Example 1 was repeated except that a five percent by weight Ardel D-100 solution was prepared in 1,2,3-trichloropropane. The resulting film contained macroscopic holes.

EXAMPLE 9

Example 1 was repeated except that a 10 percent by weight Ardel D-100 in 1,2,3-trichloropropane was prepared. The resulting film had a thickness of about 460 angstroms and contained no macroscopic pinholes.

It is apparent that a sufficient amount of ortho-dichlorobenzene must be present in the casting solution when 1,2,3-trichloropropane is employed in order to permit the casting of macroscopically pinhole-free films with thicknesses of less than 400 angstroms. In addition, the fewest number of microscopic pinholes is observed when the temperature of the water casting surface is 22° C. The examples also demonstrate that it is possible to cast pinhole-free films with thicknesses greater than 400 angstroms by employing 1,2,3-trichloropropane as the only casting solvent.

What is claimed is:

1. A process for preparing a polyarylate polymer film having a thickness of about 500 angstroms or less and containing no macroscopic holes, wherein the process comprises:
   (a) preparing a casting solution containing a polyarylate polymer in 1,2,3-trichloropropane at about the three to about the twelve percent by weight level based upon the total weight of the casting solution;
   (b) depositing the casting solution on water to form a free-standing film; and
   (c) removing the film from the water.

2. The process of claim 1 wherein the polyarylate polymer has a molecular weight, $M_w$, greater than about 5,000.

3. The process of claim 2 wherein the polyarylate polymer has a molecular weight, $M_w$, greater than about 30,000.

4. The process of claim 1 wherein the film has a thickness of about 400 angstroms or less and wherein ortho-dichlorobenzene is employed in addition to 1,2,3-trichloropropane.

5. The process of claim 4 wherein about a 2:1 to about a 20:5 by volume mixture of 1,2,3-trichloropropane:orthodichlorobenzene is employed.

6. The process of claim 5 wherein the mixture is about a 20:7 by volume mixture of 1,2,3-trichloropropane:orthodichlorobenzene.

7. The process of claim 4 wherein ethylene chloride or dichloroethane is employed in addition to 1,2,3-trichloropropane and ortho-dichlorobenzene.

8. The process of claim 1 wherein the polyarylate polymer is present at about the five to about the ten percent by weight level in the casting solution based upon upon the total weight of the casting solution.

9. The process of claim 8 wherein the polyarylate polymer is present at about the seven to about the eight percent by weight level in the casting solution based upon the total weight of the casting solution.

10. The process of claims 1, 4, 5, 6, 7, 8 or 9 wherein the polyarylate polymer has the recurring general formula:

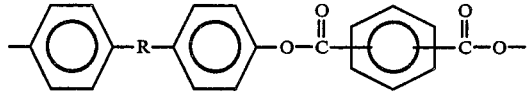

wherein R is $C_1$–$C_6$ alkyl.

11. The process of claims 1, 4 or 7 wherein the polyarylate polymer has the recurring general formula:

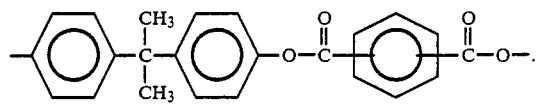

12. The process of claim 10 wherein R is $C_3$.

13. The process for preparing a polyarylate polymer film having a thickness of about 400 angstroms or less and containing no macroscopic holes, wherein the process comprises:
   (a) preparing a casting solution containing a polyarylate polymer having the general formula:

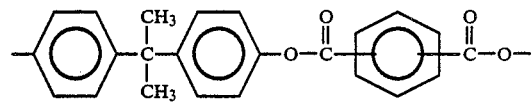

at about the three to about the twelve percent by weight level based upon the total weight of the casting solution, in about a 2:1 to about a 20:5 by volume ratio of 1,2,3-trichloropropane:orthodichlorobenzene;
   (b) depositing the casting solution on water to form a free-standing film; and
   (c) removing the film from the water.

14. The process of claim 13 wherein the ratio is about a 20:5 to about a 20:7 by volume ratio.

15. The process of claim 14 wherein the ratio is about 20:7.

16. The process of claim 13 wherein the polyarylate polymer has a molecular weight, $M_w$, greater than about 5,000.

17. The process of claim 13 wherein the polyarylate polymer has a molecular weight, $M_w$, greater than about 30,000.

18. The process of claims 13, 14 or 15 wherein the polyarylate polymer is present at about the five to about the ten percent by weight level in the casting solution based upon the total weight of the casting solution.

19. The process of claim 18 wherein the polymer is present at about the seven to about the eight percent by weight level.

20. The process of claims 1, 13, 14 or 15 wherein the casting solution contains a polyarylate polymer at about the 80 to about the 100 percent by weight level and another polymer or polymers at about the 20 to about the 0 percent by weight level based upon the total weight of the polymers dissolved in the casting solution.

* * * * *